No. 855,639. PATENTED JUNE 4, 1907.
J. JACKSON.
COMBINED COTTON CHOPPING AND CORN HOEING MACHINE.
APPLICATION FILED MAR. 28, 1907.
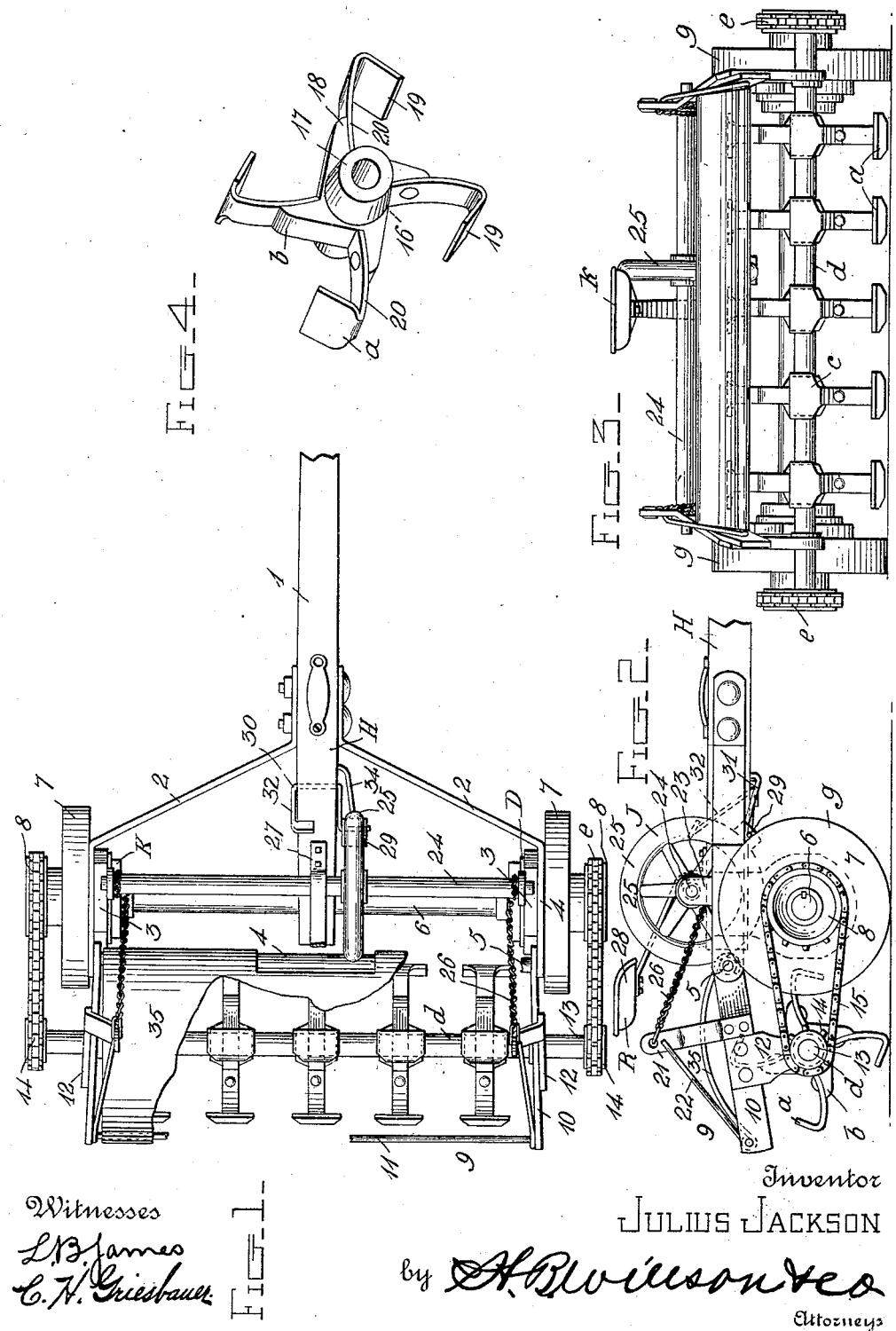
Witnesses
L. B. James
C. H. Griesbauer
Inventor
JULIUS JACKSON
by H. B. Willson & Co.
Attorneys

UNITED STATES PATENT OFFICE.

JULIUS JACKSON, OF KINGFISHER, OKLAHOMA TERRITORY.

COMBINED COTTON-CHOPPING AND CORN-HOEING MACHINE.

No. 855,639.      Specification of Letters Patent.      Patented June 4, 1907.

Application filed March 28, 1907. Serial No. 365,004.

*To all whom it may concern:*

Be it known that I, JULIUS JACKSON, a citizen of the United States, residing at Kingfisher, in the county of Kingfisher and Oklahoma Territory, have invented certain new and useful Improvements in Combined Cotton-Chopping and Corn-Hoeing Machines; and I do declare the following to be a full, clear, and exact description of the invention, such as will enable others skilled in the art to which it appertains to make and use the same.

This invention is an improved combined cotton chopping and corn hoeing machine, and it consists in the construction, combination, and arrangement of devices hereinafter described and claimed.

In the accompanying drawings,—Figure 1 is a top plan view of my improved combined cotton chopping and corn hoeing machine, a portion of the shield which covers the revoluble hoes being broken away to disclose such revoluble hoes; Fig. 2 is a side elevation of the same; Fig. 3 is a rear elevation of the same; and Fig. 4 is a perspective view of one set of revoluble hoes.

In the embodiment of my invention, I provide a truck, which is here shown as comprising a draft tongue 1, braces 2, which extend from opposite sides thereof, near its inner end, standards 3, which have their upper ends secured to the inner sides of parallel, rearwardly - extending portions 4 of said braces, a cross-bar 5, which connects the rear ends of such portions 4, an axle shaft 6 having its bearings in said standards, and supporting wheels 7 on said axles, which in practice are loose on said axle shaft and are connected thereto by interiorly-disposed pawl and ratchet mechanism of usual construction, well understood by those skilled in the art to which my invention relates, and which enable said wheels to revolve at different rates of speed as when the machine is being turned. Secured to and revoluble with each of said wheels 7 is a sprocket wheel 8.

A revoluble hoe-carrying frame 9 is disposed on the rear side of said truck. Said hoe-carrying frame is here shown as comprising a pair of end bars 10, the front ends of which are pivotally mounted on the cross bar 5, a cross-bar 11, which connects the rear ends of the said end bars 10, and a pair of standards 12, which have their upper ends secured to and which depend from said end bars 10. A shaft 13 is journaled in bearings at the lower ends of the standards 12 and is provided at its ends with sprockets wheels 14, which are connected to the sprocket wheels 8 by means of endless sprocket chains 15. On the said shaft 13, at suitable distances apart, are sets 16 of revoluble chopping hoes. Each set of revoluble chopping hoes comprises a hub 17 for attachment to said shaft and having radial arms 18 and hoes 19 which have their stems or handles 20 secured on the said arms 18.

Any suitable number of the sets of revoluble hoes may be employed according to the width of the machine, the width of the spaces between the rows when the machine is used for hoeing purposes, and the required distance between the "stands" of cotton when the machine is used for chopping cotton.

The arms 21 are secured to and extend upwardly from the end bars 10 of the frame 9. Braces 22 connect said arms and the rear ends of said bars 10. A pair of standards 23 rise from the truck at the sides thereof and are provided with bearings for a drum or winch shaft 24. Said drum or winch shaft has a hand-wheel 25 constituting a lever to enable said shaft to be readily turned. Chains 26 have their rear ends attached to the upper ends of the arms 22, and their front ends attached to said shaft 24, so that by turning said shaft to cause said chains to be wound thereon, the frame 9 may be raised to elevate the hoes, and by turning said shaft in the reverse direction, said hoe-carrying frame 9 and the hoes may be lowered, as may be understood.

On the rear portion of the tongue 1 is secured the front end of a bar 27, which supports a driver's seat 28, and it will be observed by reference to the drawings, that the said seat is in rear and somewhat to one side of the wheel 25 to enable the latter and hence also the shaft 24 to be readily turned by the driver.

A brake block 29 is on the wrist of a crank-shaft 30, which is journaled in a bearing 31 on the underside of the tongue 1. The said crank-shaft has a lever 32 here shown as a foot lever, by means of which said crank-shaft may be turned to apply the brake block to the under side of the wheel 25, or release it therefrom. An arm 34 extends from one side of the tongue and is disposed in such position as to form a support for the brake block when the latter is lowered out of contact with the wheel 25.

A cover 35 is carried by a vertically-movable hoe-carrying frame 9 and is disposed under the seat 28 and over said revolving hoes and serves to prevent the hoes from throwing dirt on the driver, and also serves to protect the driver in the event that he should fall from the seat.

From the foregoing description, taken in connection with the accompanying drawings, the construction and operation of the invention will be readily understood, without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

A machine of the class described comprising a truck having supporting wheels and a tongue, a sprocket wheel driven by one of said supporting wheels, a winding shaft mounted on said truck and having a handwheel, whereby it may be revolved, a crank-shaft having its bearing carried by said tongue, said crank-shaft having a brake element for application to said hand-wheel, and a lever whereby it may be operated, a vertically-movable frame in rear of and pivotally connected to the truck frame, a shaft carried by said vertically-movable frame and having a sprocket wheel, an endless sprocket chain connecting the wheel of the shaft to that which is driven by one of the supporting wheels, revoluble hoes carried by said shaft, and a flexible element connecting said vertically-movable frame to the winding shaft and adapted to be wound on and unwound from the latter to raise or lower said vertically-movable frame and the revoluble hoes carried thereby, substantially as described.

In testimony whereof I have hereunto set my hand in presence of two subscribing witnesses.

JULIUS JACKSON.

Witnesses:
 MARY N. LEWIS,
 ETHYLE LEWIS.